Dec. 7, 1965    P. W. THOMPSON    3,222,576
ELECTRIC IGNITION DEVICES
Filed June 1, 1964    3 Sheets-Sheet 2

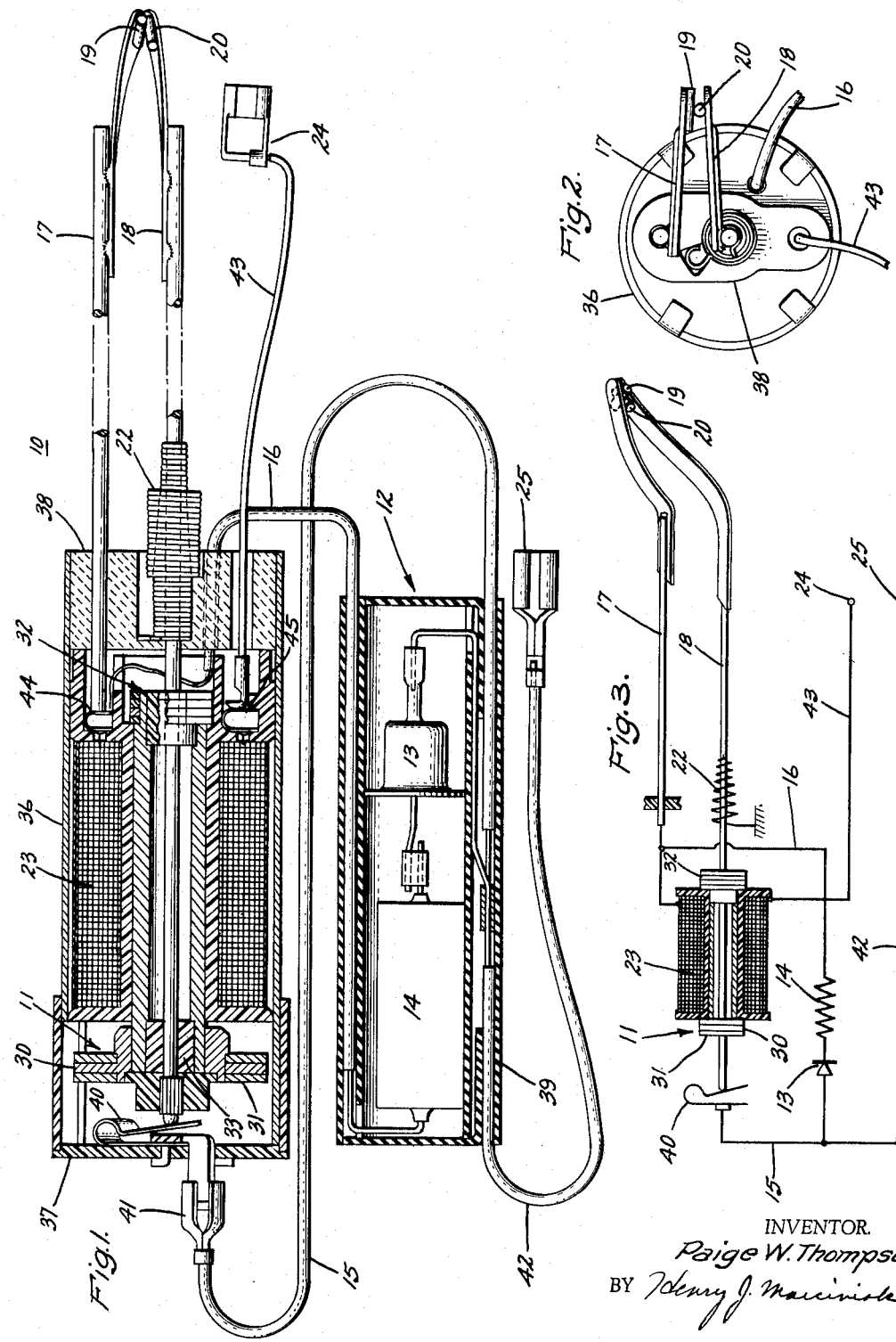

INVENTOR.
Paige W. Thompson,
BY Edward J. Hanson Jr
Attorney.

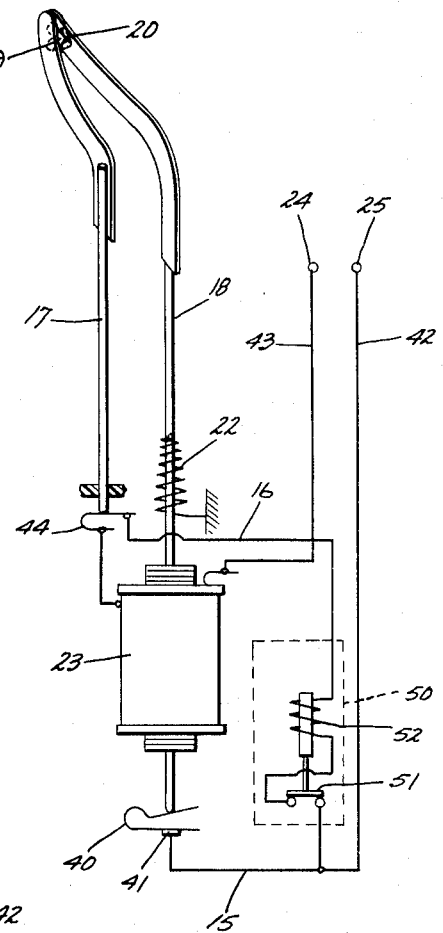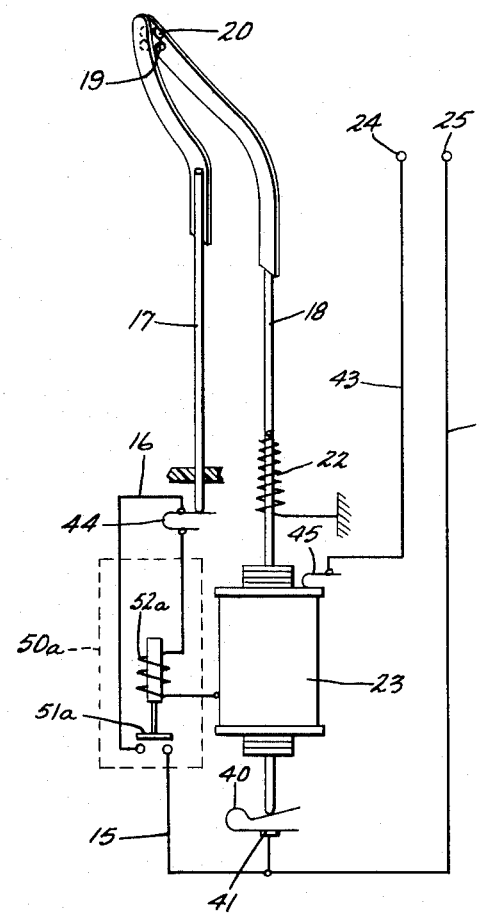

United States Patent Office 3,222,576
Patented Dec. 7, 1965

3,222,576
ELECTRIC IGNITION DEVICES
Paige W. Thompson, Morrison, Ill., assignor to General Electric Company, a corporation of New York
Filed June 1, 1964, Ser. No. 373,604
11 Claims. (Cl. 317—97)

This invention relates to electric ignition devices, and more particularly to an improved electric ignition device wherein a self-cleaning action of the ignition electrodes is effected when foreign matter lodged between the electrodes prevents the electrodes from closing the electrical circuit. This application is a continuation-in-part of my abandoned co-pending application Serial No. 289,571, filed June 21, 1963.

Electric ignition devices, which are used to ignite liquid, gaseous or pulverized types of fuels, are usually located near the fuel stream where they can provide an electric arc of sufficient intensity to cause ignition of the fuel. Frequently, foreign matter may be present in the vicinity of such devices, and may interfere with the operation of the device. For example, where the foreign matter lodges between the tips of the electrodes which are oscillated in and out of engagement to provide an electric arc for ignition, the foreign matter may in some instances prevent the contact points of the electrodes from closing the electrical circuit. Such ignition devices, especially as applied to gas dryers, have failed to operate when foreign matter, such as lint, is engaged between the electrodes and prevents the electrodes from arcing. When this occurs, it is necessary to manually remove the lint from between the electrode tips in order to render the ignition device operative. It is, therefore, desirable that ignition devices be provided with a self-cleaning arrangement wherein foreign matter lodged between the electrodes may be removed to prevent failures of the ignition device.

Accordingly, it is a general object of this invention to provide an improved electric ignition device.

A more specific object of the invention is to provide an improved electric ignition device wherein the electrodes effect a self-cleaning action when foreign matter interferes with their operation.

It is another object of the present invention to provide an improved electric ignition device wherein ignition of a combustible gas is achieved by oscillating one of the electrodes from a closed to an open position at one frequency and a self-cleaning action of the electrodes is effected when foreign matter prevents the electrodes from being returned to the closed position.

By way of illustration, I have incorporated one form of my invention in an ignition device in which one of a pair of electrodes is driven to an open position with respect to the other electrode by an electromagnetically actuated armature to provide an arc for ignition. In this ignition device the movable electrode is biased into a closed position by a spring biasing means. In order to provide an electric arc when the movable electrode is actuated to the open position, the electrodes are connected in circuit with the power supply. Also, the electrodes are connected in series circuit with the stator winding used to excite the armature that drives the movable electrode to an open position. Thus, the ignition electrodes are intermittently opened and closed as the stator winding is energized and deenergized at a selected frequency to provide an electric arc for ignition.

In accordance with my invention I have provided an auxiliary circuit arrangement across the electrodes. This auxiliary circuit intermittently energizes the stator winding upon foreign matter preventing the electrical closing of the electrodes. The auxiliary circuit is connected across the electrodes and in series with the stator winding.

By an aspect of my invention I have provided a switch in the auxiliary circuit for intermittently energizing the stator winding. Current responsive means are provided in the electric ignition device for operating the switch. In alternate embodiments these current responsive means have taken the form of heaters and relay coils and my switches have taken the form of bimetal switches and time delay relay switches.

By another aspect of my invention I have provided a diode and an impedance element in the auxiliary circuit to limit the power supplied to the stator winding when the electrodes are actuated to the open position. During the open position the power to the stator winding is not completely cut off but power is supplied at a reduced level. This reduced power level essentially has no effect on the normal operation of the improved ignition device and the shunting auxiliary circuit comes into play when foreign matter is lodged between the electrodes to prevent them from closing the electrical circuit. When this occurs, the power supplied to the stator winding is insufficient to effect a normal opening of the electrodes but is sufficient to cause the movable electrode to vibrate. This vibration dislodges foreign matter engaged between the contact points of the electrodes. When the electrodes are again joined in electrical circuit, the ignition device resumes its normal mode of operation.

Further aspects of the invention will become apparent from the more detailed description of the invention. It will be understood that the specification concludes with claims which particularly point out and distinctly claim the subject matter which I regard as my invention. The invention, however, both as to organization and method of operation, together with further objects and advantages thereof, may be best understood by reference to the following description taken in conjunction with the accompanying drawings in which:

FIG. 1 is a sectional view of an electric ignition device embodying one form of the invention;

FIG. 2 is a right end view of the electrodes of the ignition device shown in FIG. 1;

FIG. 3 is a schematic circuit diagram of the control device shown in FIG. 1;

FIG. 7 is a schematic circuit diagram similar to FIGS. 5 and 6 illustrating an electromagnetic relay employed in place of the thermal auxiliary recycling circuits of FIGS. 5 and 6; and FIG. 8 is a schematic circuit diagram similar to FIG. 7 but with a different electromagnetic relay arrangement.

Figure 4:
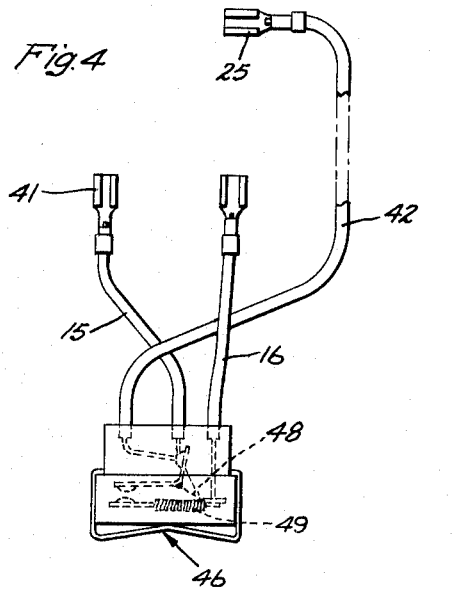
FIG. 4 is a side elevational view of a thermal auxiliary recycling circuit which may be employed in place of the auxiliary shunting circuit of FIG. 1.

Having more specific reference now to the drawings, I have shown the invention incorporated in an ignition device 10 utilizing a rotary armature 11. The particular construction of the rotary armature and stator arrangement of the invention is described and claimed in the co-pending application of Gaylord H. Wotring, Serial No. 125,557, filed July 20, 1961, which issued Sept. 1, 1964, as United States Patent 3,147,401 and which is assigned to the same assignee as the present invention.

In the improved ignition device 10 I have provided a shunting circuit 12 which includes a diode 13 and an impedance element 14 connected by leads 15 and 16 in shunt across a pair of ignition electrodes 17, 18. An electric arc is generated between contact points 19, 20 as the movable electrode 18 is intermittently rotated by armature 11 from a closed to an open position. As will hereinafter be more fully explained, the shunting circuit 12 comes into play to effect a cleaning action when foreign matter is lodged between the contact points 19, 20 of the electrodes 17, 18. When foreign matter prevents the contact points 19, 20 from closing the electrical circuit, the movable electrode 18 vibrates at a frequency of 60 cycles per second to effect a removal of the foreign matter, when operated from a 115 volt, 60 cycle power supply.

The movable electrode 18 of the ignition device 10 is normally biased into a closed position by a spring 22 and is actuated to an open position when the field coil or stator winding 23 is energized. One end of the winding 23 is connected to the input terminal 24 and the other end of the winding 23 is connected to the fixed electrode 17. When the electrodes 17, 18 are in the normally closed position, as is shown in the drawing, it will be seen that the winding 23 is energized if the terminals 24, 25 are energized. The terminals 24, 25 are provided for connection to a suitable alternating current supply. The spring 22 normally biases the movable electrode 18 into a closed position with respect to the other electrode 17 so that when the terminals 24, 25 are energized current will flow through the contact points 19, 20 of the electrodes 17, 18 to the winding 23 and through the diode 13 and impedance element 14 of the shunting circuit 12. When the contact points 19 and 20 are open, it will be seen that the supply of current through the low impedance path provided through the contact points 19 and 20 is interrupted and that current to the winding 23 is supplied through the diode 13 and impedance element 14. The impedance element 14 is preferably a resistor and serves to limit the current supplied to winding 23 when the diode 13 is biased in a forward direction. In the illustrative embodiment of the invention a 600 ohm, 3 watt resistor was used as the impedance element 14 and a General Electric diode 1N1695 was used as a half wave rectifier to reduce the amount of the power supplied to the winding 23. The shunting circuit 12 is enclosed in a paper case 39 which may be attached to the case 36.

Continuing with the more detailed description of the ignition control device 10 illustrated in FIGURE 1, it will be seen that the movable electrode 18 is connected in electrical circuit with input terminal 25 by means of a contact member 40, terminal 41, lead 15 and the connection 42. The stationary electrode 17 is connected in electrical circuit with the other input terminal 24 by means of contact member 44, the winding 23, contact member 45 and lead 43. The outer end of the spring 22 is welded to the movable electrode 18 and the inner end of the spring 22 is secured to the insulating member 38. Thus, the spring 22 normally biases the contact point 20 of the movable electrode 18 into engagement with the contact point 19 of the stationary electrode 17. The spring force exerted by the spring 22, the inertia of the armature-electrode mass system, and the torque developed by the armature 11 are factors that determine the frequency at which the electrodes 17, 18 are opened and closed. In the illustrated embodiment of the invention this frequency was approximately 10 cycles per second.

Having reference now more specifically to the schematic circuit diagram shown in FIGURE 3, the operation of the control device 10 will now be more fully explained. The input terminals 24, 25 of the ignition device 10 are normally connected to an ignition control circuit (not shown) for energization from an alternating current supply. When ignition is required, the terminals 24, 25 are energized. Since the contact points 19, 20 are normally disposed in proximity to the fuel stream, the electric arc generated between the contact points 19, 20 will cause ignition of the fuel.

When the terminals 24, 25 are initially energized, power is supplied to the winding or coil 23 since the electrodes 17, 18 are normally biased in the closed position by the spring 22. The salient poles 30, 31 of the armature 11 tend to line up with the salient poles of the magnetic circuit which includes the case 36 and stator 32, and a torque is applied to the movable electrode 18 that is sufficient to overcome the biasing force of the spring 22 and that causes the electrode 18 to swing through an arc of approximately 60 degrees. When this occurs, contact points 19, 20 are disengaged to open the low impedance connection to the field winding 23. During this interval, power is supplied at a reduced level to the field winding 23 by means of the shunting circuit which includes the diode 13 and the resistor 14. At this reduced power level, insufficient torque is developed to hold the movable electrode 18 in the open position, and the electrode 18 is rotated by a spring 22 to close the circuit. So long as the contact points 19, 20 can function to open and close the electrical circuit, the shunting circuit is essentially ineffective in the circuit.

Let us now assume that a small piece of lint is interposed between the contact points 19, 20 so that the circuit is effectively open when the spring 22 biases the electrodes 17, 18 to a closed position. During such a condition the spring force of spring 22 would normally hold the lint in engagement between the contact points 19, 20 and prevent the electrical circuit from closing. The shunting circuit now comes into play, and the power supplied to the field winding through the diode 13 and resistor 14 is sufficient to cause a vibration of movable electrode 18 at a frequency of 60 cycles per second. Preferably, a diode or other rectifying element is utilized in the shunting circuit so that the vibration occurs at 60 cycles rather than at 120 cycles. A 60 cycle vibratory motion was found to provide an effective self-cleaning action. Further, the amount of power supplied to the field winding was insufficient to effect an appreciable opening of the contacts but was sufficient to provide a vibratory movement that displaced the foreign matter lodged between the electrodes 17, 18.

Although in the just illustrated embodiment of the invention, I have utilized a half-wave rectifier to energize the field winding only in alternate half cycle of an alternating current supply, it will be appreciated that the diode element may not be required in some applications where a 120 cycle vibratory movement effects a self-cleaning action. Further, it will be appreciated that the present invention is applicable to other types of ignition devices employing electromagnetically actuated electrodes and is not limited to electromagnetic devices of the rotary type, as will be apparent to those skilled in the art.

Figure 5:
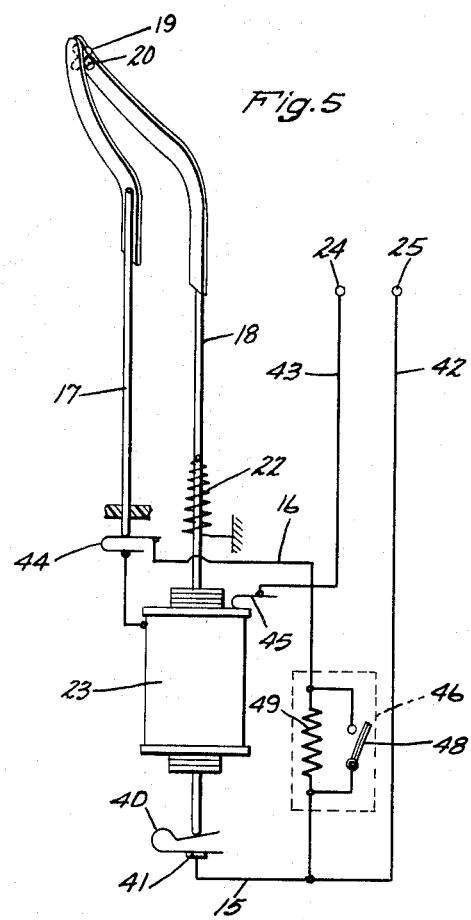
FIG. 5 is a schematic circuit diagram of the control device of FIG. 1 with the thermal auxiliary recycling circuit of FIG. 4 employed in place of the auxiliary shunting circuit.
Figure 6:
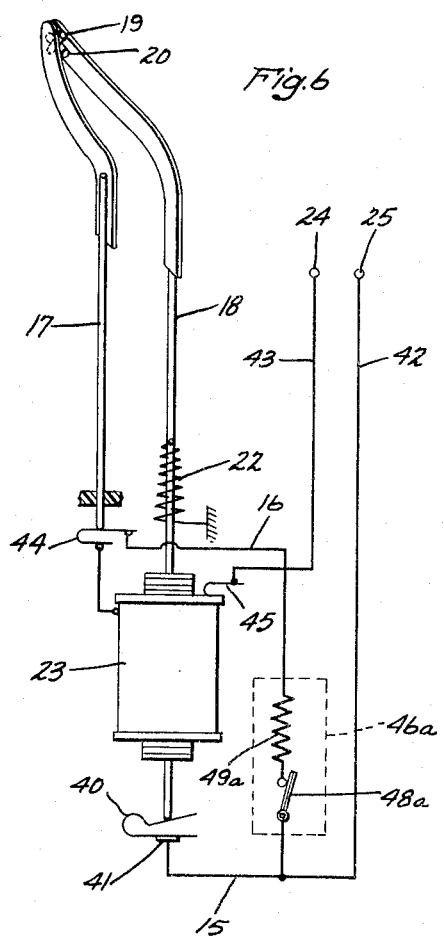
FIG. 6 is a schematic circuit diagram similar to FIG. 5 but with a different thermal auxiliary recycling circuit replacing the thermal auxiliary recycling circuit of FIG. 5.

Turning now to FIGS. 5 and 6 I have shown therein alternate embodiments of my invention, these embodiments utilizing a thermal cycling device for intermittently energizing the field winding when the electrodes fail to close normally. The embodiment of FIG. 5 incorporates a cycling device 46 which comprises a normally open bimetal switch 48 and a parallel connected actuating heater 49 as shown in FIG. 4. The embodiment of FIG. 6 includes a like device 46a which is similar to the device 46 except that its bimetal switch 48a is normally closed rather than normally open, and its heater 49a is connected in series with the bimetal switch rather than in parallel.

As shown in FIG. 5 the thermal recycling device or circuit 46 may be substituted for the shunting circuit 12 of FIGS. 1–3. The terminal and connection elements of the thermal cycling circuit 46 have been given the same designating numbers as those given to the corresponding elements of the circuit 12 and it will be understood that the connections are made in the manner described in the description of that circuit. Thus, as seen in FIG. 5 and as may be further understood by reference to FIG. 1, in the main or low impedance operating circuit the input terminal 25 is connected in electrical circuit with one end of the winding 23 by means of the connection 42, lead 15, terminal 41, contact member 40, movable electrode 18, contact point 20, contact point 19, stationary electrode 17 and contact member 44. The other end of the winding is connected in electrical circuit with the other input terminal 24 by means of contact member 45 and lead 43.

The auxiliary or thermal recycling circuit 46 is connected across the electrodes 17 and 18 forming an alternate path for energizing the winding 23. In this path the input terminal 25 is connected in electrical circuit with the winding 23 through connection 42, heater resistor 49 or the normally open bimetal shunting switch 48, lead 16 and contact member 44. Thus the electrodes are by-passed by a parallel auxiliary circuit and when they fail to close electrically due to interference from lint or some other foreign matter as previously described, continuous current through the high impedance heater 49 heats the bimetal of switch 48 sufficiently to close the normally open bimetal switch. When the bimetal switch closes, it forms a low impedance circuit shunting the heater and energizing the winding 23 to a normal operating level. This results in the opening of the movable electrode 18 and a cooling of the heater. As the heater cools, the bimetal switch re-opens deenergizing the winding and allowing the spring 22 to close the movable electrode 18. This sequence is then repeated until either the foreign matter interfering with the electrical closing of the electrodes 19 and 20 is displaced by the oscillation of the electrode 18 allowing the main circuit to close, or the ignition device is deenergized.

FIG. 6 diagrammatically shows a somewhat different type of thermal cycler, specifically the unit 46a as mentioned above. In this thermal cycler the bimetal switch 48a is in series circuit with the heater 49a and normally closed. The thermal cycler is connected across the electrodes 17 and 18 and so is shunted when the electrodes 17 and 18 close electrically. When the electrodes 17 and 18 open, the heater is energized opening bimetal switch 48a and deenergizing the winding 23. In other words both the electrodes and the switch 49a are then open so there is no closed circuit to the winding 23. Thus, there is no actuating force to keep the electrodes open and the spring 22 closes them. The electrodes normally close before the bimetal switch 48a so that the switch is shunted when it closes and will not energize winding 23 to prevent the electrodes from closing. It may be seen that if the electrodes do not close, for example, because there is foreign material between them, the bimetal switch 48a will close once it has cooled. The auxiliary circuit will then cycle the igniter until either the foreign matter interfering with the electrical closing of the contact points 19 and 20 is displaced by the oscillation of the electrode 18 thereby allowing the main circuit to close, or until the ignition device is deenergized.

It will be understood that corresponding parts in the diagram of FIG. 6 have been identified by the same referance numerals used in FIG. 5. It will also be understood by those skilled in the art that other types of thermally actuated switches may be employed besides the illustrated bimetal switches. For example, one of the well-known "hot wire" switches might be used.

By still another aspect of my invention I have provided an auxiliary circuit arrangement utilizing electromagnetic relay means for intermittently energizing the field winding when the electrodes fail to close normally. This arrangement may be seen in two of its forms in FIGS. 7 and 8 respectively. The embodiment of FIG. 7 shows a time delay electromagnetic relay 50 having a normally closed switch 51 and an actuating coil 52 connected across the electrodes 17 and 18. The embodiment of FIG. 8 shows a time delay electromagnetic relay 50a having a normally closed switch 51a connected across the electrodes 17 and 18 and an actuating coil 52a connected in series with both the switch 51a and the electrodes 17 and 18 and, of course, the winding 23. The terminal and connection elements have been given the same designating numbers in FIGS. 7 and 8 as used for the corresponding elements in FIGS. 2, 3, 5 and 6. By a time delay relay I mean a relay in which there is a time delay after the relay coil is deenergized before the contacts respond to deenergization. In the relays 50 and 50a, which are normally closed relays, the time delay is in the closing action after the coil is deenergized.

As seen in FIG. 7 the main or normal energizing circuit for the igniter winding 23 is the same as described in FIGS. 5 and 6 and so additional description will not be given here. The auxiliary circuit for energizing the winding 23 when the electrodes are fouled utilizes the aforementioned relay 50 which is connected across the electrodes. Specifically, in the auxiliary circuit the input terminal 25 is connected in electrical circuit with the winding 23 through connection 42, normally closed switch 51, relay actuating coil 52, lead 16 and contact member 44. Under normal operation of the igniter, the relay 50 is shunted by the electrodes 17 and 18 when they are closed, and is energized when they are open. The relay coil 52 opens the switch 51 quickly after the electrodes 17, 18 open but the switch does not reclose due to the time delay feature of the relay until after the electrodes close. Thus the auxiliary circuit does not supply power to the winding 23 under normal conditions and, therefore, it does not interfere with the normal cycling of the igniter.

However, if the electrodes 17 and 18 do not close normally, then sufficient time will elapse for the time delay switch 51 to close with the electrodes open. The field winding 23 will be energized through the auxiliary circuit opening the electrodes. The relay switch 51 will then deenergize the winding 23 and the relay coil, whereby the electrodes will swing toward the closed position. After an interval the switch 51 will reclose starting this sequence again. Thus the time delay relay will continue to bring about the oscillation of the electrodes until the electrodes are cleaned so that they can close electrically or until the ignition device is deenergized.

Turning now to the time delay relay arrangement shown diagrammatically in FIG. 8 it can be seen that the time delay switch 51a and the electrodes 17 and 18 are connected in parallel circuit and the parallel circuit is connected in series with both the time delay relay coil 52a and the winding 23. The time delay switch 51a is a normally closed switch but it is maintained open by the relay coil 52a as long as the coil can be energized intermittently by the normal closing of the electrodes 17 and 18. In other words, the time delay in the closing of the switch 51a is longer than the normal open interval of the electrodes.

If the electrodes fail to close, then the time delay switch 51a will close forming an auxiliary circuit through the switch and parallel to the fouled electrodes. This auxiliary circuit through switch 51a will energize both the time delay relay coil 52a and the winding 23 and thereby open the switch 51a and the electrodes. The switch 51a may be set to open slightly faster than the electrodes, thus causing a higher than normal voltage potential at the electrodes as they are opening. This may cause an arc across the electrodes when arcing would not occur under normally applied current conditions. Of course, the auxiliary circuit will continue to cycle the electrodes until they close normally or until the igniter is deenergized.

From the foregoing description of the operation of the improved arrangements in accordance with the present invention, it will be apparent that an important advantage of the invention is that it is possible to provide electrodes of ignition devices with an inherent self-cleaning action. I have provided auxiliary circuit means across the electrodes for energizing the field winding 23 upon foreign matter preventing the electrical closing of the electrodes. In each embodiment the auxiliary circuit is such that it will not interfere with a normal cycling of the igniter so long as the electrodes can close electrically.

While in accordance with the Patent Statutes, I have described what at present are considered to be the preferred embodiments of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In an electric ignition device, an igniter having a pair of ignition electrodes relatively movable between closed and open positions, biasing means urging said electrodes to the closed position, electric actuating means for driving the electrodes from the closed position to the open position at a selected frequency to provide an intermittent arc across the electrodes, circuit means connecting said electrodes and said actuating means in series circuit, said actuating means when energized causing said electrodes to be driven to the open position providing an arc and breaking said circuit allowing said biasing means to close said electrodes and reenergize said circuit, and an auxiliary circuit means for energizing said actuating means upon foreign matter preventing the electrical closing of said electrodes, said auxiliary circuit means being connected in parallel to said electrodes and in series with said actuating means and forming an electrical path for intermittently energizing said actuating means when said electrodes fail to close normally.

2. In an electric ignition device, an igniter having a pair of ignition electrodes, electrically energized actuating means for opening and closing said electrodes electrically at a selected frequency to provide an intermittent arc across the electrodes, circuit means connecting said electrodes and said actuating means in series circuit to provide intermittent electrical energization of said actuating means as said electrodes open and close electrically, and an auxiliary circuit for energizing said actuating means upon foreign matter preventing the electrical closing of said electrodes, said auxiliary circuit including a switch connected in parallel relation to said electrodes and in series circuit with said actuating means, and current responsive means for operating said switch, said switch intermittently energizing said actuating means to provide said electrodes with an opening and closing self-cleaning action when said electrodes fail to close normally.

3. The electric ignition device set forth in claim 2 wherein said switch includes a bimetal actuator, and said current responsive means is an electric heater, said switch and said heater being connected in series circuit.

4. The electric ignition device set forth in claim 2 wherein said switch includes a bimetal actuator and said current responsive means is an electric heater, said switch and said heater being connected in parallel circuit.

5. In an electric ignition device, an igniter having a pair of ignition electrodes, an electrically energized actuating means for opening and closing said electrodes electrically at a selected frequency to provide an intermittent arc across the electrodes, circuit means connecting said electrodes and said actuating means in series circuit to provide the intermittent electrical energization of said actuating means as said electrodes open and close electrically, and auxiliary means including an electrically operated relay device for intermittently energizing said actuating means upon foreign matter preventing the electrical closing of said electrodes, thereby to provide said electrodes with an opening and closing self-cleaning action, said relay including an operating coil and a switch, and said switch being connected in parallel relation to said electrodes and in series circuit with said actuating means.

6. The electric ignition device of claim 5 wherein said relay switch is a normally closed time delay switch, and said relay coil is connected in series circuit with said switch across said electrodes.

7. The electric ignition device of claim 5 wherein said relay switch is a normally closed time delay switch, and said relay coil is connected in series circuit with said switch and said electrodes.

8. An electric ignition device comprising: a pair of ignition electrodes relatively movable to a closed and open position, a pair of terminals for connection in circuit with an alternating current source, means for biasing said electrodes to the closed position, actuating means for driving said electrodes from a closed position to the open position at a selected frequency to provide an arc across the electrodes for ignition, said actuating means including a winding, circuit means connecting said electrodes and said winding in series circuit relation with said terminals, said winding when energized causing said electrodes to be driven to the open position, and a shunting impedance means connected in circuit across said electrodes for energizing said winding at a relatively low power level during the open position of the electrodes thereby to cause said electrodes to vibrate when foreign matter is disposed between said electrodes and effect a self-cleaning action of the electrodes.

9. An electric ignition device comprising a stator including a field winding, an armature excited by said field winding, a pair of ignition electrodes actuable between an open and closed position, one of said electrodes being movable relative to the other and driven by said armature, means for biasing the movable electrode to one of said positions, a pair of terminals for connection in circuit with an alternating current source, circuit means connecting said field winding and said electrodes in series circuit relation with the terminals, said armature and said biasing means acting alternately upon said movable electrode to drive said electrodes from the closed to the open position at a selected frequency and provide an intermittent arc across the electrodes for ignition, and shunting circuit means connected across said electrodes to energize said field winding at a power level sufficient to cause said electrodes to vibrate when foreign matter between said electrodes prevents them from closing the electrical circuit thereby to effect a self-cleaning action of the electrodes.

10. In an electric ignition device having a pair of electrodes, one of said electrodes being movable relative to the other from a closed to an open position, a pair of terminals for connection with an alternating current source, means for biasing said electrodes to a closed position, actuating means for driving the electrodes from the closed position to the open position at a selected frequency to provide an intermittent arc across the electrodes, said actuating means including a winding connected in series circuit relation with the electrodes, said winding when energized causing said actuating means to drive said electrodes to the open position to interrupt the power supplied to the winding, the improvement comprising a diode and an impedance element connected in shunt across said electrodes, said diode causing said winding to be energized in each alternate half cycle when said electrodes are in the open position thereby to cause said electrodes to vibrate when the electrodes are prevented from closing because of the presence of foreign matter between the electrodes and disengage the foreign matter.

11. An electric ignition device comprising: a stator having a field winding, a rotor supported for relative rotation with respect to said stator and being rotatable in response to the excitation by said field winding, a pair of terminals for connection with an alternating current source, a pair of ignition electrodes, one of said electrodes being rotatable relative to the other, a spring biasing means urging said movable electrode into contact with the other electrode, circuit means connecting said winding and said electrodes in circuit with said terminals, said rotor driving said rotatable electrode from a closed position to the open position at a selected frequency to provide an arc across the electrodes for ignition, a rectifying element and a resistor connected across said electrodes, said rectifying element and resistor providing a path for power to be supplied to said winding to effect a vibratory movement of said movable electrode at a frequency greater than said selected frequency to effect a self-cleaning action when foreign matter lodged between said electrodes prevents them from being engaged in a closed position.

References Cited by the Examiner
UNITED STATES PATENTS

| | | | |
|---|---|---|---|
| 1,655,458 | 1/1928 | Dolfi | 317—93 |
| 1,763,443 | 6/1930 | Righetts | 313—152 |
| 2,536,468 | 1/1951 | Russell | 317—92 |
| 2,982,882 | 5/1961 | Rodelli | 317—95 |
| 3,021,455 | 2/1962 | Weber | 317—191 |
| 3,147,401 | 9/1964 | Wotring | 317—97 |

FOREIGN PATENTS

| | | |
|---|---|---|
| 265,725 | 2/1927 | Great Britain. |

References Cited by the Applicant
UNITED STATES PATENTS

| | | |
|---|---|---|
| 1,709,055 | 4/1929 | Blakeslee. |

RICHARD M. WOOD, *Primary Examiner.*